US010269260B2

(12) United States Patent
Ellis

(10) Patent No.: US 10,269,260 B2
(45) Date of Patent: Apr. 23, 2019

(54) SYSTEM AND METHOD FOR COACHING A DRIVER

(71) Applicant: HONDA MOTOR CO., LTD., Tokyo (JP)

(72) Inventor: Nathaniel C. Ellis, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 609 days.

(21) Appl. No.: 14/821,424

(22) Filed: Aug. 7, 2015

(65) Prior Publication Data
US 2017/0039870 A1    Feb. 9, 2017

(51) Int. Cl.
G09B 9/04       (2006.01)
G01S 19/42     (2010.01)
G09B 9/042     (2006.01)
G09B 19/16     (2006.01)

(52) U.S. Cl.
CPC ............... G09B 9/04 (2013.01); G01S 19/42 (2013.01); G09B 9/042 (2013.01); G09B 19/167 (2013.01)

(58) Field of Classification Search
CPC ........ G09B 9/04; G09B 19/167; G09B 9/042; G01S 19/42
USPC ...................................................... 434/66
See application file for complete search history.

(56) References Cited

U.S. PATENT DOCUMENTS

| 5,354,202 A | 10/1994 | Moncrief et al. |
| 5,366,376 A | 11/1994 | Copperman et al. |
| 8,133,115 B2 | 3/2012 | Campbell |
| 8,485,822 B2 | 7/2013 | Lind |
| 2010/0253594 A1* | 10/2010 | Szczerba ............... G01S 13/723 345/7 |
| 2011/0093190 A1 | 4/2011 | Yoon |
| 2012/0306896 A1 | 12/2012 | Krauss et al. |
| 2016/0084661 A1* | 3/2016 | Gautama .............. G01C 21/365 701/400 |

OTHER PUBLICATIONS

Joseph, Chevy Corvette Stingray goes high-tech with Performance Data Recorder, posted on autoblog.com on Jan. 5, 2014 [retrieved on Aug. 28, 2014], 4 pages. Retrieved from http://www.autoblog.com/2014/01/05/chevy-corvette-stingray-performance-data-recorder/.
Pattni, Jaguar reveals 'virtual windscreen', posted on www.topgear.com on Jul. 11, 2014 [retrieved on Aug. 26, 2015], 2 pages. Retrieved from http://www.topgear.com/car-news/future-tech/jaguar-reveals-%E2%80%98virtual-windscreen%E2%80%99.

* cited by examiner

Primary Examiner — Robert P Bullington
(74) Attorney, Agent, or Firm — Kenealy Vaidya LLP

(57) ABSTRACT

Various methods and systems are provided to coach a driver of a vehicle as to the location of a reference brake point on a roadway, such as a race track, including determining a present location of a vehicle on a roadway, determining a distance between the present location of the vehicle and a reference brake point, and communicating of an indication of the distance between the present location of the vehicle and the reference brake point.

18 Claims, 8 Drawing Sheets

SYSTEM AND METHOD FOR COACHING A DRIVER

FIELD OF THE INVENTION

The present disclosure generally relates to methods and systems for coaching a driver of a vehicle, and more particularly to coaching a driver of a vehicle to improve or enhance vehicle control as the vehicle navigates a race track or other driving environment.

BACKGROUND

Drivers have raced automobiles for nearly as long as automobiles have existed. To that end, like many sports or competitive endeavors, both professional and amateur drivers are constantly trying to improve their driving skills, for example, to shave seconds or even fractions of seconds off their lap times. Drivers can spend thousands of dollars and hundreds of hours on training instruction to better their skills on the race track. Though suitable for at least some purposes, such approaches do not necessarily meet all needs of all drivers. Some drivers may prefer more flexibility that formal instruction as well as real time feedback while they drive or race a vehicle.

SUMMARY

In one embodiment, a vehicle includes a global positioning satellite (GPS) system configured to determine a present location of the vehicle on a roadway, a memory device configured to store a plurality of reference brake points corresponding to the roadway, and a display. The vehicle includes an electronic control unit (ECU) coupled to the GPS system, the memory device, and the display. The ECU is configured to receive a signal from the GPS system indicative of the present location of the vehicle on the roadway, receive from the memory device at least one reference brake point of the plurality of reference brake points, determine a remaining traveling distance between the present location of the vehicle on the roadway and the at least one reference brake point, and cause the display to display to a driver of the vehicle a graphical representation of the remaining traveling distance between the present location of the vehicle and the at least one reference brake point.

In another embodiment, a system includes a location detection device configured to generate information related to an approximate present location of a vehicle on a roadway, a memory device configured to store at least one reference brake point corresponding to the roadway, and a controller coupled to the location detection device and the memory device. The controller is configured to receive the information related to the approximate present location of the vehicle from the location detection device, receive from the memory device data corresponding to the at least one reference brake point, determine a remaining distance between the present location of the vehicle and the at least one reference brake point, and effect output via a human machine interface (HMI) of an indication of the remaining distance between the present location of the vehicle and the at least one reference brake point.

In another embodiment, a method includes determining, by a controller, a present location of a vehicle on a roadway, determining, by the controller, a distance between the present location of the vehicle and a reference brake point, and effecting communication, by the controller, of an indication of the distance between the present location of the vehicle and the reference brake point.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
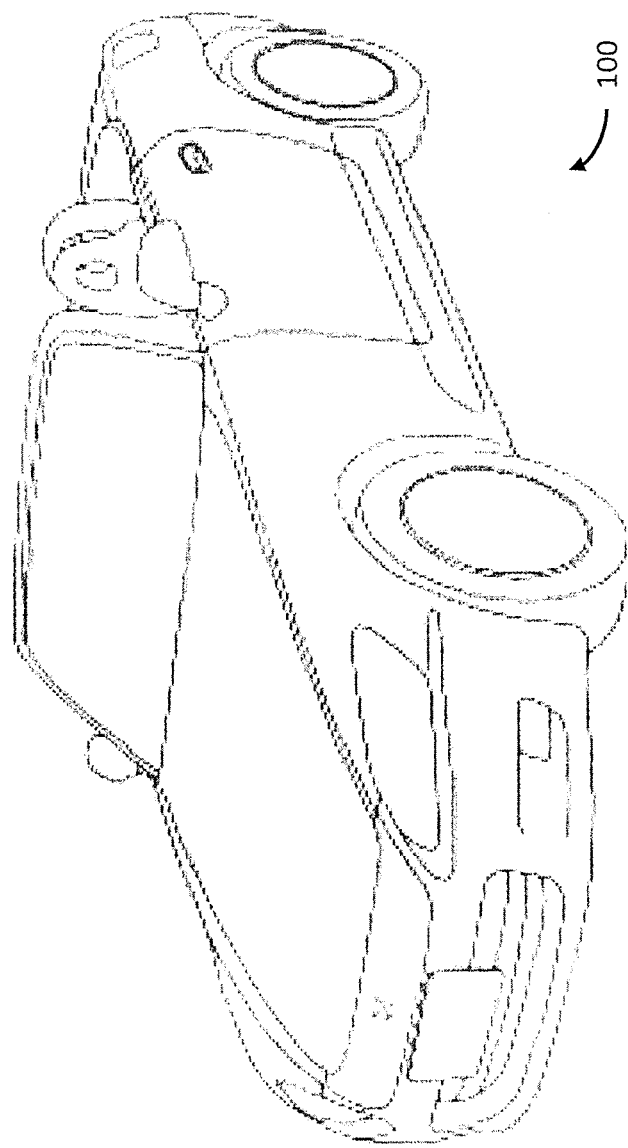
FIG. 1 depicts an example of vehicle that may be used to implement a driver feedback system, in accordance with various embodiments.

Referring now to the figures, FIG. 1 illustrates an example of a vehicle 100 that may utilize the embodiments described herein. As is shown, the vehicle 100 may include an automobile, a car, or a racecar. However, the embodiments disclosed herein may be applicable to a truck, a van, a sport-utility vehicle (SUV), a motorcycle, an all-terrain vehicle (ATV), a snowmobile, a recreational vehicle, or other vehicles, whether or not motorized. The vehicle 100 may include any or all of the elements described herein to implement the disclosed embodiments, and particularly any and all of the elements depicted in FIG. 2.

Figure 2:
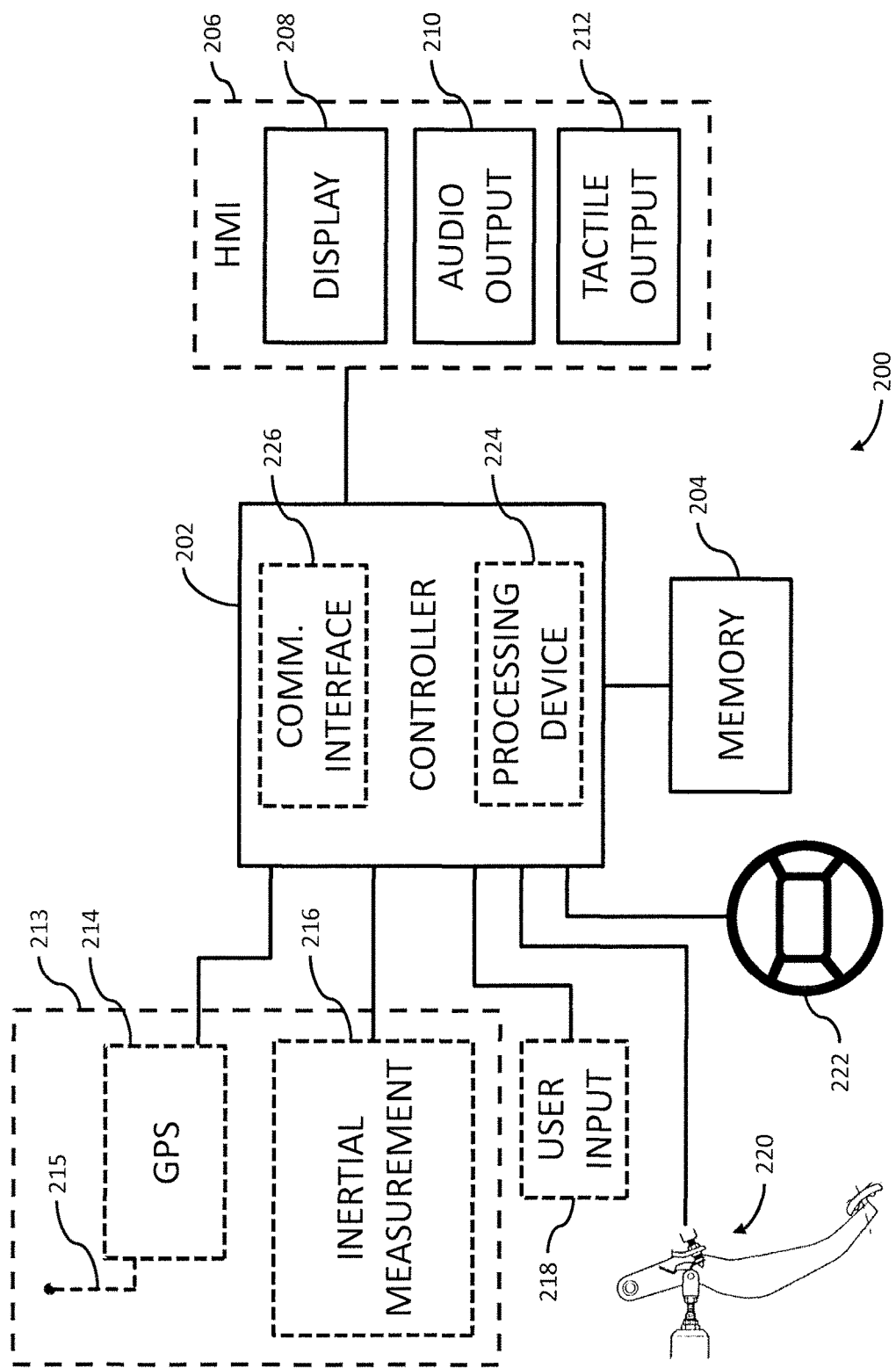
FIG. 2 is a block diagram of a system, in accordance with various embodiments, for implementing various ones of the enclosed embodiments.

Turning now to FIG. 2, a system 200 is illustrated in accordance with various embodiments for implementing various ones of the disclosed embodiments. The system 200 may include a controller 202, one or more memory devices 204, and a human-machine interface (HMI) 206. In various embodiments, the HMI 206 may include a display 208, an audio output 210, and/or a tactile output 212. In some embodiments, the system 200 may also include a location detection device 213, which may comprise a global positioning satellite (GPS) system 214 (e.g., a GPS receiver), which may include a GPS antenna 215, and/or an inertial measurement device 216. The system 200 may also include a user input device 218. The system 200 may also include or utilize inputs from various other vehicle control elements such as a brake pedal 220 or a steering wheel 222. Other vehicle control elements are contemplated as well, including, for example, a gear selector, a gear shift (e.g., a stick shift or paddle shifters), a clutch pedal, an engine on/off interface, a parking brake interface, a turn signal interface, a lighting interface, an audio interface, a navigation interface, a multimedia interface, or any other interface as may commonly be included with a vehicle 100. In accordance with various embodiments, all or some of the elements shown in FIG. 2 may be integrated as part of the vehicle 100. Alternatively, in other embodiments, all or some of the elements shown in FIG. 2 (for example, with exception to the brake pedal 220 and the steering wheel 222) may exist separately from the vehicle 100.

In various embodiments, the controller 202 may be communicatively coupled to any or all of the other elements, either directly or indirectly through one or more interface modules or intermediary modules, systems, or vehicle communication networks. For example, the controller 202 may be communicatively coupled to the memory device 204. Alternatively, the controller 202 may include the memory device 204, or at least a portion of a memory device 204 (e.g., one or more memory modules of a plurality of memory modules comprising the memory device 204) internal thereto. The controller 202 may be communicatively coupled to the HMI 206, including any one of display 208, audio output 210, and/or tactile output 212. The controller 202 can also be communicatively coupled to the GPS system 214, the inertial measurement system 216, the user input 218, the brake pedal 220, the steering wheel 222, or any other element of the vehicle 100. Various ones of the elements described herein may also be communicatively coupled to each other directly or indirectly, for example, through the controller 202 or external to the controller 202, and with or without passing through the controller 202. The interconnections between the various elements and modules can be via known or unknown communication protocols (e.g., controller area network (CAN), and the like), which communication protocols may or may not be common to vehicle 100 or other vehicles. The communication protocols may include wired connections (e.g., conductor-based or fiber-based communications) or wireless connections (e.g., Bluetooth or Wi-Fi).

In one embodiment, the controller 202 includes at least one processing device 224. The processing device 224 may include one or more microprocessors, microcontrollers, field-programmable gate arrays (FPGA), application-specific integrated circuits (ASIC), digital signal processors (DSP), or other known processing device types or combinations thereof. The processing device 224 may, in certain embodiments, include or be coupled to memory devices, for example, memory device 204. In certain embodiments, the controller 202 may also include internally therein, or be communicatively coupled to, a communication interface 226 to communicate with other devices, for example, devices external to the vehicle 100. The communication interface 226 may include various wired (e.g., USB, Ethernet, etc.) and/or wireless (e.g., Bluetooth, Wi-Fi, etc.) interfaces to enable the controller 202 to receive and/or output information corresponding to the embodiments disclosed herein, as is described in further detail below.

In various embodiments, the controller 202 is, may include, is integrated with, or is a portion of an electronic control unit (ECU) for the vehicle 100. In other embodiments, the controller 202 is implemented as a controller that is separate from the ECU of the vehicle 100. In such embodiments, controller 202 may be another controller or module integrated into the vehicle 100 to provide dedicated functionality to implement the embodiments disclosed herein (for example, as a dedicated race training controller module). Alternatively, controller 202 may serve other functions in addition to the embodiments disclosed herein (for example, a controller module also tasked with providing navigation information, vehicle performance information, or multimedia information in addition to performing the disclosed embodiments).

Alternatively still, in various other embodiments, the controller 202 may be a separate device that is not directly integrated with the vehicle 100 but interfaces with the vehicle 100. For example, controller 202 could include a portable device, such as a laptop, a smartphone, or other hardware system, that interfaces with the vehicle 100, for example, through an data port (e.g., an on-board diagnostic (OBD) 2 port) or through another dedicated or general interface. In such an approach, the controller 202 may be transferable between multiple vehicles. In various embodiments wherein the controller 202 is not the ECU for the vehicle 100, communication with the other elements or modules that may be included in the vehicle 100 (e.g., HMI 206, brake pedal 220, etc.) may ultimately be effected through the ECU of the vehicle 100 or another control module of the vehicle 100. Further still, such a separate controller may provide additional information to the ECU or another control module of the vehicle 100 such that those systems may utilize the provided information, for example, to effect display of an image on a display of the vehicle 100 or to alter performance characteristics of the engine, and so forth.

Figure 3:
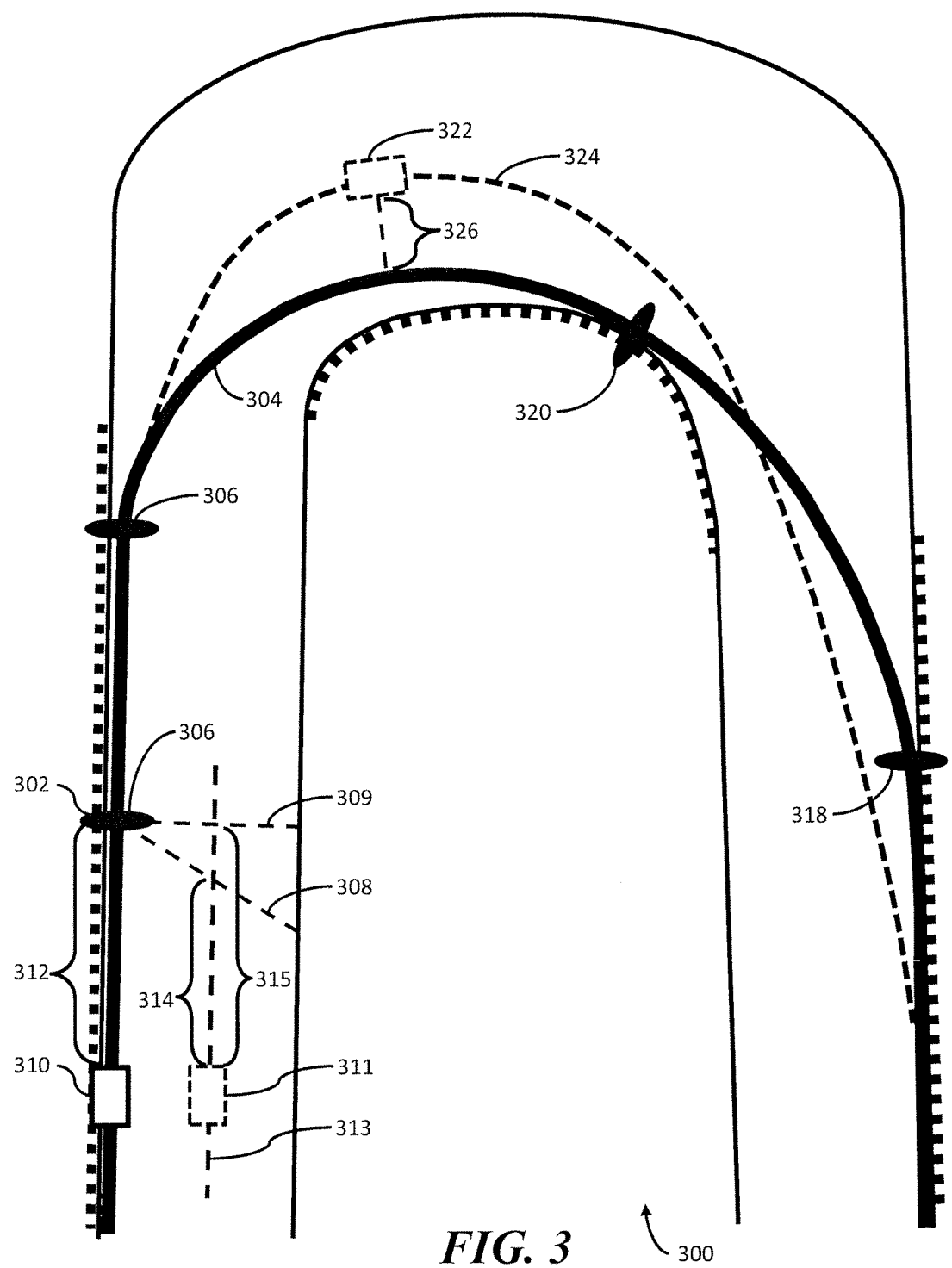
FIG. 3 depicts an example race track application setting for use with the various disclosed embodiments.

Turning now to FIG. 3, various functions of the system 200 are described in a contextual race track 300. In the present disclosure, race track 300 may refer to a formal race track, perhaps operated by a private entity, enabling drivers to race vehicles in controlled environments enabling safe racing. In other embodiments, race track 300 may refer to other roadways or environment on or in which a vehicle may be driven. In that case, the system 200 may assist a driver to navigate the roadway with more precision, quickly, or safely. The present disclosure uses the term race track, though it will be understood by a person of ordinary skill in the art that the present disclosure is relevant to any vehicle navigating a road way, whether a conventional race track or not.

In accordance with various embodiments, the system 200 implements a racing coach to provide a driver of vehicle 100 with real-time information as to suggested actions to be taken while driving on the race track 300 or previous actions that have been taken on the race track 300 by the same vehicle 100 and/or driver or by other vehicles and/or drivers. For example, and in accordance with various embodiments, one function of the system 200 may be to provide a braking coach function that provides a driver of vehicle 100 with information as to a reference brake point 302, being a suggested brake point or a previously recorded brake point by the same vehicle 100 and/or driver or by other vehicles and/or drivers. In accordance with various other embodiments, a second function of the system 200 may be to provide a racing line coach function that provides a driver of the vehicle 100 with information as to a reference racing line 304 (shown as dashed line 304 in FIG. 3), being a suggested racing line or a previously recorded racing line by the same vehicle 100 and/or driver or by other vehicles and/or drivers. The system 200 may be capable of providing either or both of these two functions, as well as other coaching functions. If the system 200 can provide both functions, both functions may be provided simultaneously or individually one at a time. A driver or user may be able to enable or disable one or both functions and/or customize presentation of the information as may best suit their individual needs or desires.

Proper braking (e.g., braking at an ideal braking point) as the vehicle 100 engages a turn can be one of the most critical aspects for improving lap time while racing. The brakes slow the vehicle 100 down, which is, in the most basic sense, counter to the goal of maintaining speed to lower the lap time. Thus, it is often a goal to limit the use of the brake to the minimal amount of usage needed to navigate the race track 300. Conversely, if too little braking is used, or if braking is used at the incorrect times or locations on the race track 300, a driver runs the risk of failing to properly navigate the turn (e.g., failing to follow an ideal racing line through the turn). Failing to properly navigate the turn could result in slower speed carried through the turn, slower exit speed at the end of the turn, additional braking required during the turn, or, in a worst case scenario, loss of control of the vehicle 100, all of which are factors that can lead to undesired higher lap times.

The impact on lap times due to proper braking can vary with different scenarios, race track configurations, and individual turns. For example, if a turn is a fast corner (e.g., a turn that can be navigated at a fast speed, therefore requiring little or no braking), proper braking may have less of an effect on the lap time. However, if a turn is a slow corner (e.g., a turn that requires a slower speed to navigate, often requiring substantial initial braking or braking through the turn) proper braking may have a greater effect on the lap time. Furthermore, the effect of proper braking in a slow corner can be increased when the slow corner is preceded by or followed by a straightaway. If preceded by a straightaway, braking may be required to take the vehicle 100 from a relatively high speed (e.g., 120 mph) generated on the straightway down to a relatively slow speed (e.g., 40 mph) required to correctly navigate the turn. Proper braking can be the most difficult to achieve in such a scenario because the speed differentials from before the braking event (e.g., in the straightaway) to after the braking event (e.g., in the turn) are the greatest. For example, if the driver brakes too early, the driver loses the benefit of carrying the maximum amount of speed through the entirety of the straightaway, thereby increasing lap time. But if the driver brakes too late, the vehicle 100 may not be able to properly navigate the turn, thereby increasing lap time.

Additionally, in another scenario, the turn may be followed by another straightaway, in which case it can be paramount to carry the greatest amount of exit speed at the exit of the turn. Proper braking prior to the turn allows for either the maximum amount of speed to be carried through the turn and/or for a maximum exit speed to be achieved at the exit. Further, proper braking prior to the turn also enables proper navigation of the turn to allow for a racing line that can maximize the exit speed.

The ideal braking point for a particular turn can vary for different vehicles, for example, dependent upon the performance characteristics of the particular vehicle. Example performance characteristics that can vary from vehicle to vehicle, but are important to the location of an ideal brake point include the speed the vehicle 100 is capable of achieving prior to entering the turn (e.g., vehicle power), the braking capabilities of the vehicle 100 (e.g., braking distance), the handling capabilities of the vehicle 100 (e.g., a skidpad rating or a slalom rating), the weight of the vehicle 100, the type of tires and their associated grip, the current temperature or quality of the tires (e.g., accounting for changing tire grip) or the brakes or brake pads (e.g., accounting for brake fade), the current suspension setup, the current track conditions, the comfort level of the driver, as well as other factors.

Without years of racing experience and/or extensive familiarity with the performance and feel of a particular vehicle 100, a driver may incorrectly guess as to the proper braking point, which can negatively impact the lap time. Moreover, even experienced drivers may benefit from brake coaching to further improve their skills. Previous braking coach techniques (e.g., using cones on the side of the track) do not account for the particular performance aspects of a specific vehicle 100 and thus do not provide the level of accuracy required to enable a driver to truly improve their braking technique in a particular vehicle. Thus, even if an experienced driver wished to improve their performance with braking coaching, such previous coaching techniques may not be capable of delivering vehicle-specific and/or driver-specific coaching with the necessary accuracy and granularity to provide substantial help to the driver.

Similarly, as mentioned above, navigating an individual turn, a series of turns, or the entirety of a race track along a proper racing line can also improve lap times. For example, an inexperienced driver, or even an experienced driver, may traverse through a turn or multiple turns on an improper racing line, thereby increasing their lap times. Previous racing line coaching techniques (for example, a coaching passenger generally instructing "stay to the left on this turn") may not provide the accuracy or granularity required to provide substantial help to the driver.

To address these insufficiencies or other insufficiencies, and to provide various benefits, in various embodiments, the system 200 provides a braking coach function. In one embodiment, the system 200 is for coaching a driver of the vehicle 100 and includes a location detection device 213 that is configured to generate information related to an approximate present location of the vehicle 100 on a physical race track or other driving environment. As stated above, the location detection device 213 may include a GPS system 214 and/or an inertial measurement device 216 which may work together or separately to provide information regarding the present location and/or heading of the vehicle 100.

In one approach, the GPS system 214 is integrated with the vehicle 100 and may provide or operate in coordination with another module of the vehicle 100 to provide other location-based functions. For example, the GPS system 214 may be part of or operate with a navigation system for the vehicle 100 to provide day-to-day navigation directions. In another approach, the GPS system 214 is a commonly available GPS receiver that may or may not be integrated with the vehicle 100. Other similar location detection systems are contemplated, including other satellite navigation systems and/or global navigation satellite systems (GNSS).

In certain embodiments, an inertial measurement device 216 can provide position data instead of or in addition to the GPS system 214. The inertial measurement device 216 may include one or more accelerometers, magnetometers, gyroscopes, or other devices, and may be part of or separate from another vehicle module, for example, a navigation system. In certain embodiments, the inertial measurement device 216 can calculate, or provide data that can be used to calculate, an approximate location of the vehicle 100 on the physical race track, for example, by accumulating various force and acceleration vectors, orientations, and their changes over time. In theory, an inertial measurement device 216 can determine a route traveled, particularly when that route starts and ends in the same location (as occurs on a race track). In one application, a driver or other user of the vehicle 100 can interface with a user input 218 (e.g., a button, a switch, a voice recognition system, or another interface) to "mark" the beginning and/or end of a lap of the race track, which may aid the system 200 in determining the position of the vehicle 100 when using an inertial measurement device 216. In certain embodiments, calculation of the position of vehicle 100 with the inertial measurement device 216 can be enhanced by incorporating data from other elements or modules within the vehicle 100, for example, a steering wheel 222 orientation, a determined speed of the vehicle 100, and/or an odometer reading or other distance reading. In certain embodiments, only the data from the inertial measurement device 216 is used to calculate the position of the vehicle 100. In another embodiment, data from the inertial measurement device 216 can be used in combination with GPS data from GPS system 214 to enhance the accuracy of the position data.

Many GPS systems 214 are capable of delivering fairly accurate relative positional data, but may suffer from higher tolerances as to absolute position accuracy (e.g., due to part tolerances, programming, etc.). However, high accuracy with regard to absolute positioning on a race track 300 may not be required in every application setting because a lap on a race track 300 typically starts and ends in the same location. Thus, in certain embodiments, as long as the system 200 can determine where the start/stop location is on the race track 300 and/or can determine the approximate route of the race track 300 (e.g., as compared to a known route for a known race track 300), the system 200 can calculate, account for (e.g., calibrate), or simply disregard any offset with respect to the absolute position and can instead rely on the accuracy of the relative positional data. As mentioned above, a driver or other user of the vehicle 100 may use a user input 218 to "mark" the beginning and/or end of a lap, which data can be used by the system 200 to account for any offsets. Further, in another embodiment, after a reference lap is completed and the route recorded, the system 200 may be able to calibrate itself by comparing the recorded route to a known route of a known track (for example, as may exist in a database of known tracks that may exist on the memory device 204), for example, by calculating/approximating any differences. Many other calibration techniques are possible.

In yet another embodiment, a differential GPS (DGPS) system may be utilized with the system 200 to provide positioning data with greater accuracy, for example, in the sub-meter and centimeter range. DGPS is an enhanced form of GPS that typically requires one or more additional local ground transmitter stations (e.g., antennas), which may be portable or permanently installed at a location. A DGPS receiver, for example, on vehicle 100, can use both standard GPS signals and the added DGPS signal to provide a more accurate position reading.

According to various embodiments, the system 200 also includes memory device 204 that stores at least one reference brake point corresponding to the physical race track, and possibly corresponding to a reference lap about the physical race track. For example, the reference brake point may be stored as absolute coordinates (e.g., absolute GPS coordinates corresponding to an absolute latitude and longitude) or relative coordinates (e.g., relative GPS coordinates or another type of coordinates relative to, for example, a start/stop point or some other point). The reference brake point could also be stored as another value, for example, a travel distance (for example, from the start/stop point), a travel time (possibly incorporating a travel speed aspect), or another position metric, and can possibly take into account previous readings or anticipated readings from inertial measurement device 216. With reference again to FIG. 3, example reference brake point 302 is illustrated. In various embodiments, the reference brake point 302 may be a particular point location 306 on the race track, for example, a 2-dimensional coordinate, or may be a line 308 or 309 (e.g., straight or curved) existing across the race track lane and corresponding to the suggested point during travel at which the vehicle 100 should begin braking. A line, such as line 309, may be perpendicular to the race track or to the direction of travel of the vehicle 100. Alternatively, the line, such as line 308, can be angled, for example, to account for different brake points as may be suggested according to different racing lines (e.g., racing line 313) the vehicle 100 may take when approaching the turn. As is shown in FIG. 3 with respect to angled line 308, the system 200 may determine that a vehicle 100 closer to the inside edge on racing line 313 while approaching the turn may need to brake sooner than a vehicle 100 on an outside edge following the reference racing line 304. In various embodiments, the system 200 can extrapolate an angled line 308 or a perpendicular line 309 from a particular point location 306 reference brake point, for example, with the knowledge of the turn type (e.g., the degree of the turn, the radius of the turn, and/or other turn aspects), the race track layout, the anticipated speed approaching the turn, or other factors. Generation of the reference brake point 302 and/or the positional data of the reference brake point 302 is discussed further below.

In various embodiments, the system 200 also includes controller 202 configured to receive the information related to the approximate present location 310 of the vehicle 100 from the location detection device 213 (e.g., positional data of the present location 310 of the vehicle 100 on the physical race track 300, which may include signals from the GPS 214 indicative of the present location 310 of the vehicle 100) and receive from the memory device 204 the reference brake point 302 (e.g., positional data of the reference brake point 302). In various embodiments, the controller 202 is also configured to determine a remaining distance 312 between the present location 310 of the vehicle 100 and the reference brake point 302. This remaining distance may be a remaining traveling distance which the vehicle 100 may travel before encountering the reference brake point 302 on the race track 300. With respect to FIG. 3, the remaining distance could be the distance 312 between the present location 310 of the vehicle 100 and the reference brake point 302. For example, the remaining distance could be a distance which the vehicle 100 will travel prior to passing the reference brake point 302 on the race track. More specifically, the remaining distance could be a linear distance between the present location 310 of the vehicle 100 and a particular point location 306 as a reference brake point 302 (e.g., a distance between two sets of two-dimensional coordinates). In another embodiment, the remaining distance could be a linear distance 312 between the present location 310 of the vehicle 100 and a line 308 or 309 or other shape as the reference brake point 302 (e.g., a distance between a two-dimensional coordinate and a line). Such a line 308 may be straight, curved, angled (e.g., angled line 308), or orthogonal (e.g., orthogonal line 309) to the race track lane, the reference racing line 304, or a present heading of the vehicle 100. In one example, if vehicle 100 is at a different present location 311 on a different racing line 313 than the reference racing line 304, the distance between the different present location 311 and the angled line 308 could be distance 314. Similarly, the distance between the different present location 311 and the orthogonal line 309 could be distance 315, which may be longer than distance 314 in certain embodiments and in accordance with the particular racing needs of a particular turn. This second approach (distance 315 to orthogonal line 309) could simply be viewed according to various embodiments as merely calculating a distance (e.g., distance 312 and/or distance 315) until the vehicle 100 passes the reference brake point 306. This approach provides a simple calculation of the distance (e.g., distance 312 and/or distance 315) that also takes into account the fact that a vehicle 100 may use differing racing lines (e.g., reference racing line 304 or other racing line 313), while favoring a reference brake point position corresponding to the reference racing line 304. As mentioned above, the remaining distance could be a remaining travel distance, for example, which may take into account a present heading of the vehicle 100, a reference racing line 304 or 313, and/or a known curvature of the race track (e.g., stored in memory device 204).

In various embodiments, the controller 202 is also configured to effect output via an HMI 206 of an indication of the remaining distance (e.g., distance 312, 314, and/or 315) between the present location of the vehicle (e.g., present location 310 and/or 311) and the reference brake point 306. For example, the controller 202 may communicate to the particular HMI device 206 the data required to provide the indication (e.g., an actual graphic used for a graphical representation and/or the actual audio used for an audible indication). In another approach, the controller 202 merely provides data (e.g., a distance or a timing value) to the particular HMI device 206 or module controlling the particular HMI device 206 such that the HMI device and/or controlling module determines and/or generates the actual indication output via the HMI device 206 (e.g., the actual graphic or audio). In other approaches, the responsibility for generation of the actual indication can be shared between the particular HMI device 206 and the controller 202.

Figure 4:
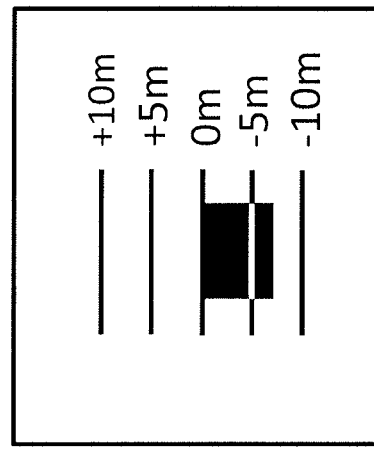
FIGS. 4-7 depict example graphical indications of distances in accordance with various embodiments

Turning now to FIG. 4, in one embodiment, the controller 202 effects a display 208, for example, a display 208 integrated with the vehicle 100, to display a graphical representation 400 of the remaining distance between the present location of the vehicle 100 and the reference brake point. In one embodiment, the graphical representation 400 includes a bar 402 or other variable graphic element that represents the distance between the vehicle 100 and the reference brake point. The graphical representation 400 may also include a graph or markers 404 that correspond to the bar 402 such that a driver is informed of the scale of the bar 402.

Figure 5:
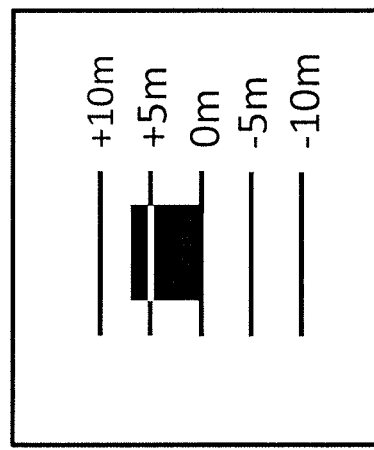
Figure 6:
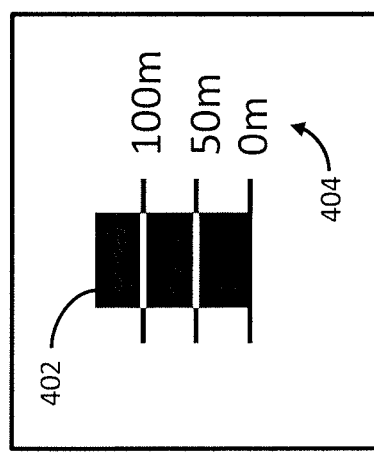

In certain embodiments, as the vehicle 100 approaches the reference brake point, the graphical representation 400 may change, for example, to rescale the bar 402 and/or the markers 404 to provide increased granularity and accuracy at shorter distances. For example, as is illustrated in FIGS. 5 and 6, the scale may change for markers (e.g., reading "5 m" and "10 m" instead of "50 m" and "100 m" as shown in FIG. 4). Further, as is shown in FIG. 6, a graphical representation 600 may provide negative distances as the vehicle 100 passes the reference brake point. Many other graphical representations 400 are possible, many of which may vary in style and/or visual communication aspects, and are contemplated by this disclosure.

In other embodiments (in addition to or in lieu of the display 208 embodiment discussed above), the controller 202 may effect an audible indication (e.g., a sound) to be emitted via audio output 210 (e.g., via the audio system of the vehicle 100 or via another audio output). For example, the audible indication may include a voice announcing a distance until braking (e.g., "brake in 100 meters—50 meters—now"). In another example, the audible indication may include a voice announcing a time-based countdown (e.g., "brake in 3—2—1—now") or a series of tones announcing a time-based countdown. In yet another example, the audible indication may include a series of tones or a tone that increases or decreases in volume and/or frequency as the vehicle 100 approaches the reference brake point. The time at which particular audible indications may be generated can be determined based upon a distance of the vehicle 100 from the brake point.

In another embodiment, the controller 202 may effect a tactile indication to be generated via tactile output 212. For example, the steering wheel 222, a seat, a pedal, a paddle shifter, a stick shift, a helmet, a smartphone, or some element of the vehicle 100 or in communication with the controller 202 may be made to vibrate or buzz at differing frequencies, intervals, and/or intensities to communicate the distance between the present location of the vehicle 100 and the reference brake point and/or a determined time until the reference brake point is reached. Additionally, the indication may include any or all of the graphical representation 400, the audible indication, or the tactile indication simultaneously or at approximately the same time. In various embodiments, a driver or other user of the vehicle 100 may be able to select a type or types of indication she wishes to receive.

For any indication that includes a time aspect (e.g., a time-based countdown), the controller 202 may also take into account a present velocity of the vehicle 100 in addition to the determined distance between the present location of the vehicle 100 and the reference brake point when determining when to begin such a time-based indication (e.g., when to begin counting down) and the pace at which the indication should be provided, such that the vehicle 100 reaches the reference brake point approximately upon completion of the time-based countdown.

In various embodiments, the system 200 may provide feedback to the driver on the driver's performance. For example, with reference to FIGS. 5 and 6, in one embodiment a graphical representation 500 or 600 may include an instant or real-time feedback graphical representation showing a the distance between the reference brake point and the location at which the driver actually began braking. FIG. 5 shows a feedback graphical representation 500 where the driver had commenced braking prior to arriving at the reference brake point (e.g., showing about 7 meters prior). Conversely, FIG. 6 shows a feedback graphical representation 600 where the driver had commenced braking after arriving at the reference brake point (showing about 7 meters after). Various visual aspects of the feedback graphical representation 500 and/or 600 may differ in each situation. For example, the bar in FIG. 500 may be red (indicating braking too early, which generally leads to poor performance) while the bar in FIG. 6 may be displayed as green (showing the driver that she is pushing the vehicle 100 harder). The feedback graphical representation 500 and/or 600 may be displayed for an amount of time after passing the reference brake point or after braking has begin commencing (e.g., for 10 seconds after (or another suitable time after) or until approaching a subsequent reference braking point). The feedback graphical representation 500 and/or 600 may include or exhibit other visual aspects that distinguish itself from a graphical representation 400 of an approaching reference brake point. For example, the feedback graphical representation 500 and/or 600 may flash or be displayed in different colors (e.g., red or green, as opposed to blue) or a different opacity. Similarly, in other embodiments, feedback may be provided via audio output 210 to inform the driver of their performance.

The teachings disclosed above with respect to a reference brake point may be also used to coach a driver of a vehicle 100 with respect to other driving aspects. For example, and with reference to FIG. 3, instead of or in addition to providing an indication of a remaining distance until a reference brake point 302, an indication could be provided as to a remaining distance until a reference turn-in point 316. The reference turn-in point could be a suggested point on the race track at which the driver commences turning the vehicle 100 into the turn after braking. The controller 202 may determine a remaining distance between the present location of the vehicle and the reference turn-in point 316 and may also effect communication of such a distance to the driver. Similar approaches could be used to provide indications of distances until reference track-out points 318, reference full throttle points, reference trail braking points, reference brake release points, reference gear change points, reference apex points 320, a start/stop point, a reference tailing distance (e.g., between the vehicle 100 and another vehicle), or other reference points as may be useful for coaching a driver of vehicle 100.

With reference again to FIG. 3, the system 200 may provide coaching as to a reference racing line 304. In one embodiment, the controller 202 may receive from the memory device 204 data pertaining to a reference racing line 304. The controller 202 may determine a distance between the present location 310 of the vehicle 100 and a reference racing line 304. In various embodiments, the controller 202 determines a present lateral distance, or side-to-side distance, between the present location 310 of the vehicle 100 and the reference racing line 304. For example, if a present location of the vehicle 100 is location 322 on present racing line 324, the controller 202 may determine a lateral distance 326 between the present location 322 and a corresponding point on the reference racing line 304. The lateral distance 326 may be orthogonal to the present heading of the vehicle 100 or may be orthogonal to the corresponding point on the reference racing line 304. The present heading of the vehicle 100 may be determined using data from GPS 214 and/or inertial measurement device 216. For example, when in a turn, the lateral distance 326 may be orthogonal to the tangent of the curve of the present racing line 324 at the present location 322. Alternatively, the lateral distance 326 may be orthogonal to the tangent of the curve of the reference racing line 304 at a point corresponding to the present location 322 of the vehicle 100, where such an orthogonal line would intersect the present location 322 of the vehicle 100. The lateral distance 326 may be measured on other lines not necessarily orthogonal to the present heading of the vehicle 100 or the curve of the reference racing line 304 (e.g., orthogonal to the direction in which the front tires are turned, the shortest distance between the present location 322 and any point on the reference racing line 304, or determined by other methods or based on other factors).

Figure 7:
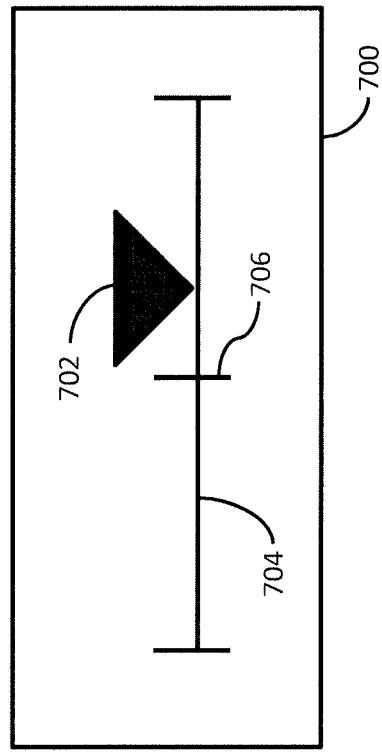

In various embodiments, the controller 202 is configured to effect communication of an indication of the location of the reference racing line as compared to the present location of the vehicle 100, for example, to a driver of the vehicle 100. Turning now to FIG. 7, an example graphical indication 700 of the location of the reference racing line as compared to the present location of the vehicle 100 is provided. In one embodiment, a marker 702 (shown as an inverted triangle in FIG. 7) is provided on a horizontal line 704, the horizontal line possibly including one or more tick marks. In one example, a center mark 706 of the horizontal line represents the center of the vehicle 100, while the marker 702 represents a lateral location of the reference line as compared to the center of the vehicle 100. In one illustrative example, as is shown in FIG. 3, as the vehicle 100 traverses the turn on present racing line 324 and is located at present location 322, the reference racing line 304 would be to the right of the present location 322 of the vehicle 100. Thus, as is shown in FIG. 7, the marker 702 would be shown to the right of the center mark 706, therefore informing the driver to move further to the right in order to be on the reference racing line 304.

In another approach, the functions of the marker 702 and the horizontal line 704 are reversed such that the marker 702 represents the present location of the vehicle (e.g., present location 322) and the center mark 706 on horizontal line 704 represents the location of the reference racing line 304. Thus, in the example shown in FIG. 3, when the vehicle 100 is at present location 322, the marker 704 would be to the left of the center mark 706, indicating that the vehicle 100 is left of the reference racing line 304, which is opposite to the embodiment illustrated in FIG. 7 and discussed directly above.

It should be appreciated that many graphical representations are possible to convey the distance between the present location of the vehicle 100 and the reference racing line 304 and are contemplated with this disclosure. For example, other graphical representations could include arrows or other indicia that convey a direction in which the driver should further steer in order to be on the reference racing line. Other embodiments may include varying an intensity, color, size, or blink rate of such arrows or other indicia, or of marker 702 in FIG. 7, in accordance with the degree to which the vehicle 100 has strayed from the reference racing line.

As mentioned above with respect to providing an indication of the remaining distance to a reference brake point, other non-visual indications may be provided in addition to or in lieu of a graphical indication (such as graphical indication 700). For example, a voice could provide an audible indication to move to the right or left to rejoin the racing line. Tones could be provided in stereo that correspond to the direction in which the driver should further steer in order to be on the reference racing line. For example, if the driver needed to move to the right, a tone could be emanated from the right speaker of the vehicle 100 or a right headphone on the driver's ears. Similarly, the volume, pitch, tone, frequency, or interval of the tone could vary according to the degree to which the vehicle 100 has strayed from the reference racing line. Similarly still, tactile outputs could be produced to provide the indication. For example, a right side of the steering wheel, a right paddle shifter, a right portion of the helmet, or a right side of the seat could vibrate when the vehicle 100 needs to move to the right to be on the reference racing line. The intensity, frequency, or interval of the vibration could vary according to the degree to which the vehicle 100 has strayed from the reference racing line.

Figure 8:
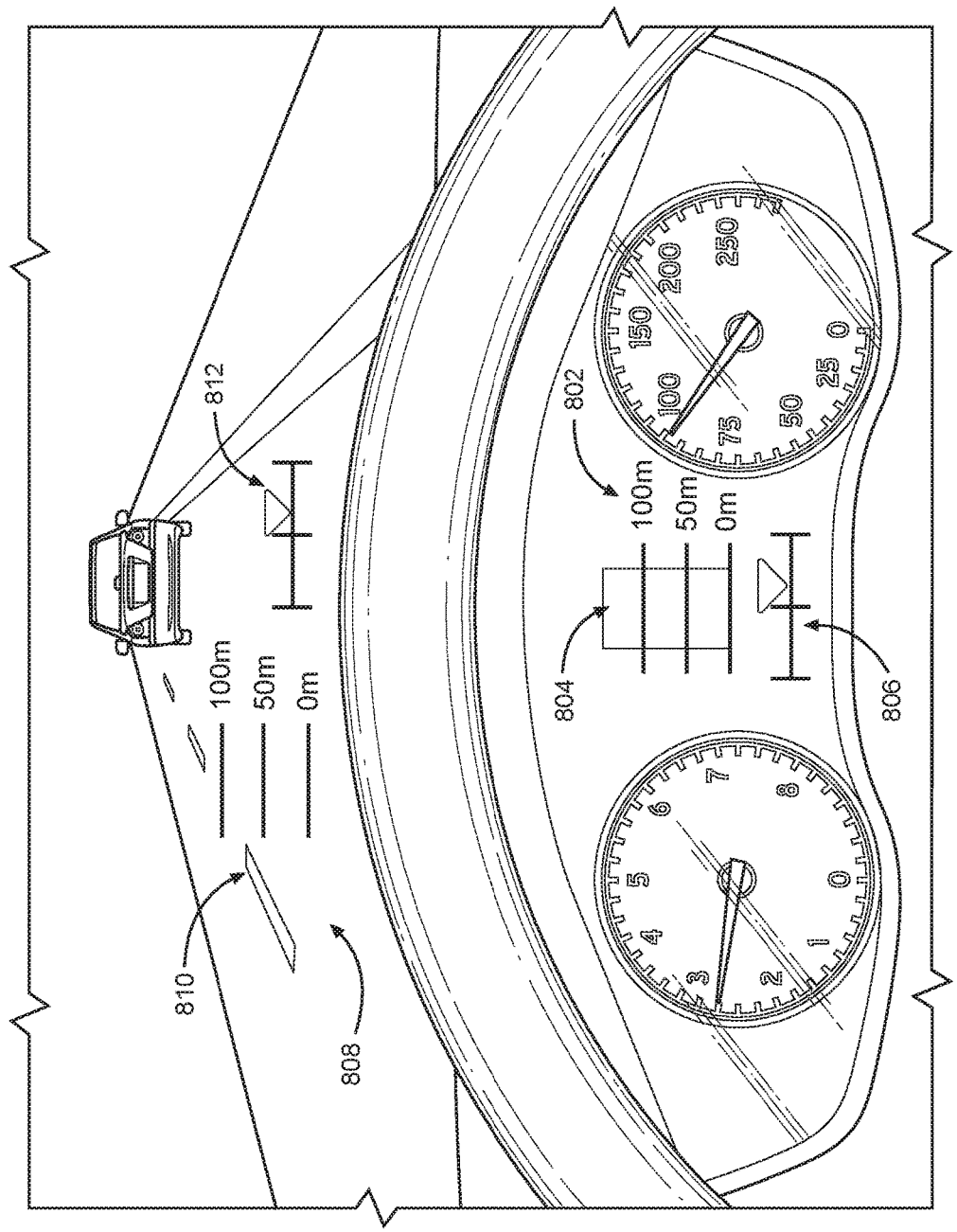
FIG. 8 is an example display of various graphical indications within a vehicle in accordance with various embodiments.

Turning now to FIG. 8, various example displays of graphical representations of a remaining distance to a reference brake line and a lateral distance to a reference racing line are provided. In one example, a display 802 of the vehicle 100 is provided and/or utilized. The display 802 may correspond to display 208 discussed with respect to FIG. 2 as one example HMI 206. The display 802 may be utilized for other display functions simultaneously or while in other modes. The display 802 may be located within an easy viewing location, such as within an instrument cluster of the vehicle 100, possibly in the center of the instrument cluster, and may be viewable through or above the steering wheel. As is shown, the display 802 may include in one embodiment the graphical indication 804 of the remaining distance between the vehicle 100 and the reference brake point. Additionally, in another embodiment, the display 802 may also include the graphical indication 806 of the location of the reference racing line as compared to the present location of the vehicle 100.

In another embodiment, a heads-up display 808 (e.g., reflected off of or incorporated into the windshield) may include a graphical indication 810 of the remaining distance between the vehicle 100 and the reference brake point and/or a graphical indication 812 of the location of the reference racing line as compared to the present location of the vehicle 100. The heads-up display 809 may be utilized for other display functions simultaneously or while in other modes. In various embodiments, one or all of these example graphical indications 804, 806, 810, 812 may be provided, and may be customizable (e.g., as to activation, location, colors, etc.) by a driver or user of the vehicle 100. Other variations are possible as to the display of such graphical indications, including the use of separate and/or dedicated displays.

In further embodiments, the system 200 may display an image of the reference racing line, possibly superimposed over a representation of the race track, before approaching a turn or other critical racing line aspect. Such an image may be a two-dimensional image showing the reference racing line from above (e.g., similar to the image shown in FIG. 3). In another embodiment, such an image may be a three-dimensional representation of the track as may be similar to the view of the driver. In another embodiment, the system 200 could manipulate such an image in real-time according to the location and heading of the vehicle 100 and could also display the present location of the vehicle as compared to the reference racing line on such a representation of the track. Additionally, in another embodiment, the system 200 can provide instant feedback to a driver, for example, after navigating a turn, which feedback image may show the reference racing line in comparison to the actual recorded racing line on which the vehicle traveled. Such a feedback image may look like that shown in FIG. 3, in various embodiments. In other embodiments, the feedback image may be a three-dimensional image. Many variations are possibly in these regards.

Figure 9:
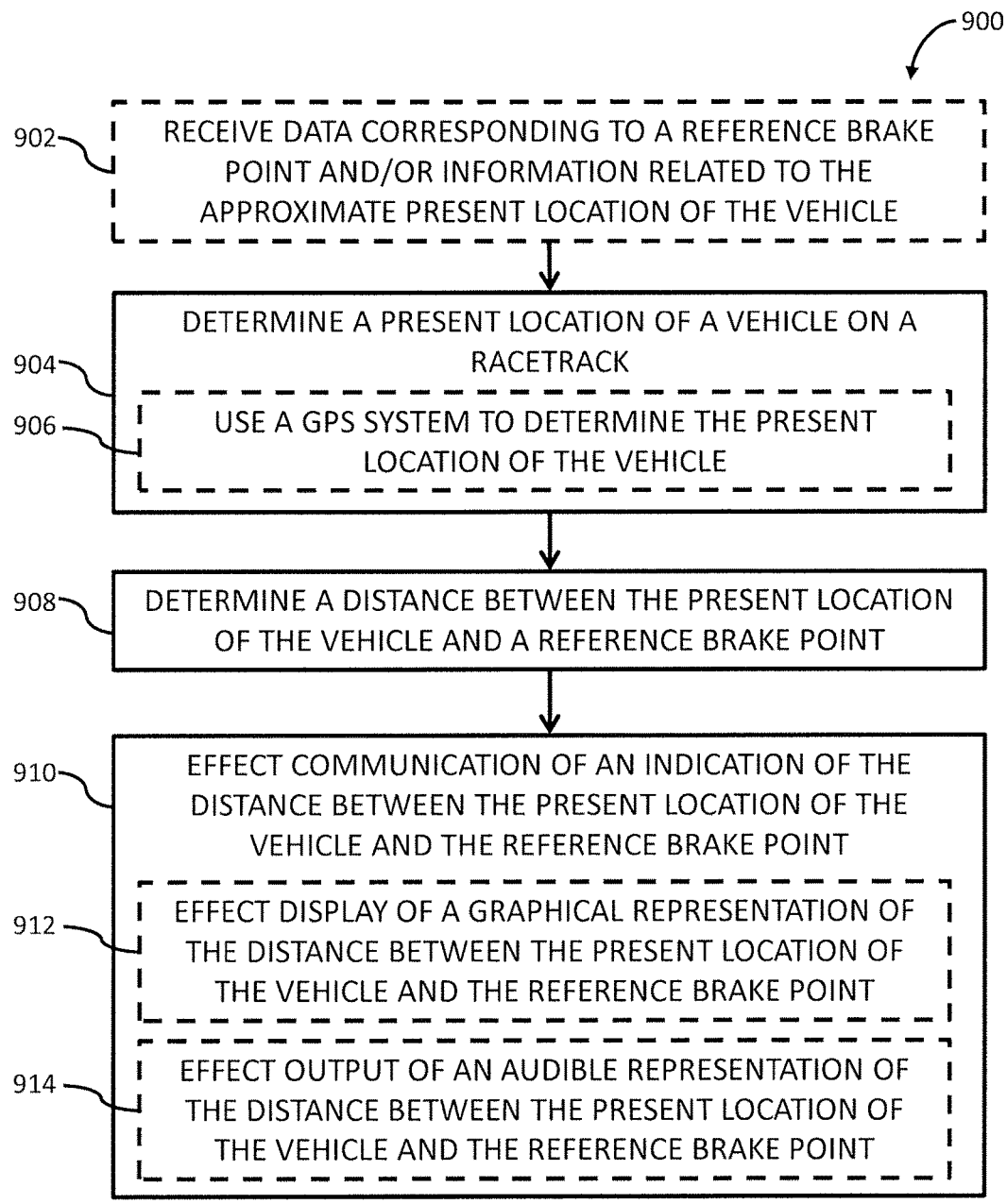
FIG. 9 is a flowchart depicting a method of coaching a driver in accordance with various embodiments.

Turning now to FIG. 9, an example method 900 is provided in accordance with various embodiments. In one approach, the method 900 is a method for coaching a driver of a vehicle while driving the vehicle on a physical race track. In one embodiment, the method may begin with an optional step 902 of controller 202 receiving from memory device 204 data relating to at least one reference brake point corresponding to the physical race track. At step 904, the controller 202 may determine the present location of the vehicle 100 on the physical race track. This may optionally include at step 906 the controller 202 receiving from location detection device 213, for example, from GPS 214 and/or inertial measurement device 216, information related to an approximate current location of the vehicle 100 on the physical race track. At step 908, the controller 202 determines a remaining distance between the present location of the vehicle 100 and the reference brake point. At step 910, the controller effects communication of an indication of the remaining distance. In one embodiment, this further entails, at step 912, effecting display on a display 208 of a graphical representation of the remaining distance or, in another embodiment at step 914, effecting provision of an audible indication based on the remaining distance. In one example, such an audible indication includes an audible time-based countdown based on the remaining distance and the present velocity of the vehicle 100, wherein the time-based countdown is provided such that the vehicle 100 reaches the reference brake point approximately upon completion of the countdown.

Figure 10:
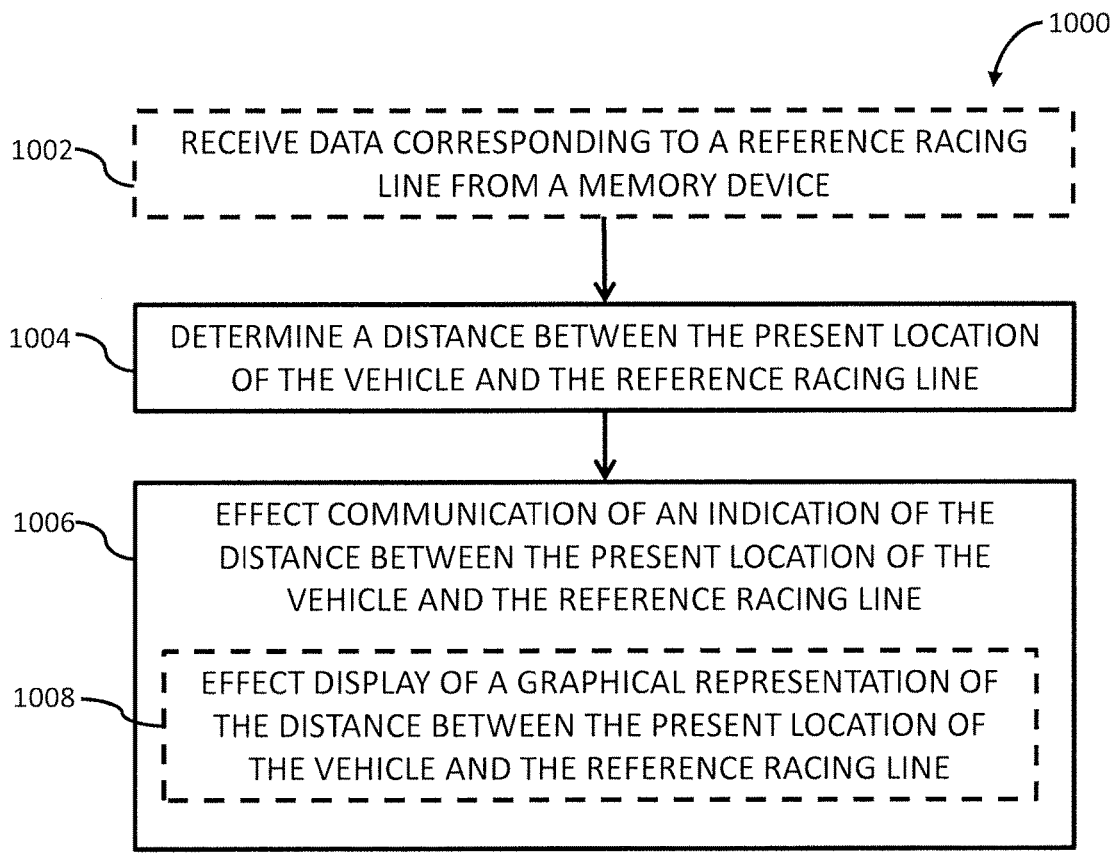
FIG. 10 is a flowchart depicting another method of coaching a driver in accordance with various embodiments.

FIG. 10 provides another example method 1000 in accordance with various embodiments, which all or portions of method 1000 may be combined with all or portions of method 900 in various embodiments. At optional step 1002, controller 202 receives from memory device 204 data corresponding to a reference racing line. At step 1004, controller 202 determines a present distance (e.g., lateral distance) between the present location of the vehicle 100 and the reference racing line. At step 1006, controller 202 effects output via the HMI of an indication of the distance between the vehicle 100 and the reference racing line. In one embodiment, at optional step 1008, the indication of the distance between the vehicle 100 and the reference racing line includes a graphical representation of the present lateral distance between the present location of the vehicle 100 and the reference racing line.

Figure 11:
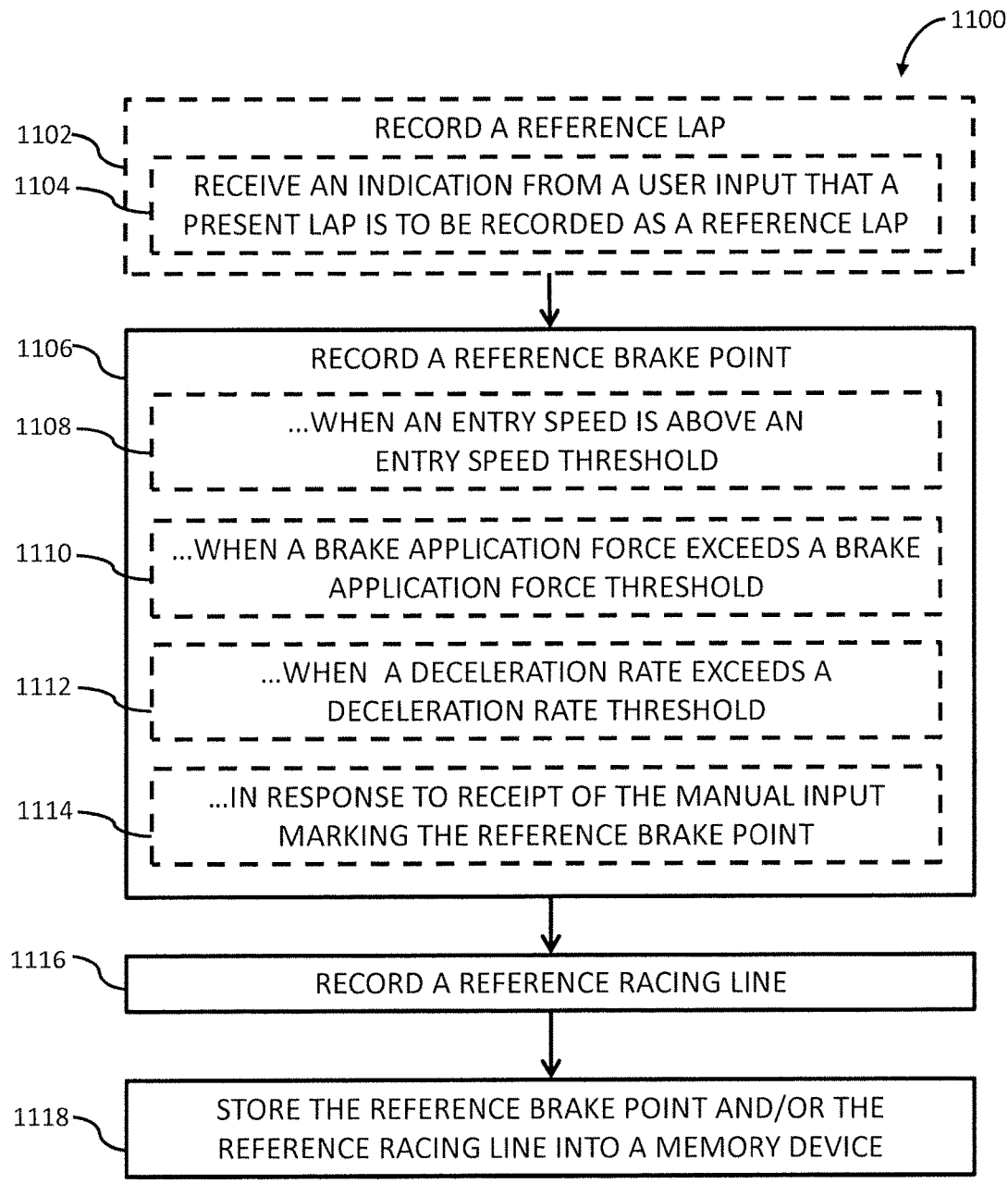
FIG. 11 is a flowchart depicting a method of recording various aspects of a reference lap in accordance with various embodiments.

Turning now to FIG. 11, an example method 1100 for recording and/or generating a reference lap, a reference brake point, a reference racing line, or other reference points is provided in accordance with various embodiments. At option step 1102, the method 1100 includes recording a reference lap. In one embodiment, as indicated in optional step 1102, recording a reference lap includes or is responsive to a driver or user of the vehicle 100 activating a user input 218 to indicate that present lap is a reference lap and driving the vehicle 100 on the physical race track to establish the reference lap. As is discussed below, recording the reference lap may include recording one or more reference brake points, reference racing lines, reference turn-in points, reference track-out points, reference apex points, and/or various other points or functions relative to the lap as part of the reference lap.

In one embodiment, the vehicle 100 is driven around the race track at full racing speed to establish the reference lap (including, for example, reference brake points and/or a reference racing line). For example, a skilled driver may drive the vehicle 100 in one or more laps to establish a reference lap that can be used to coach a less experienced driver. In such an approach, the user input 218 may be activated to establish such a lap as a reference lap. In another example, the reference lap may be simply the fastest lap driven on that physical race track previously by the vehicle 100 and/or the driver.

In another embodiment, the vehicle 100 may be driven around the race track at a slow speed (possibly very slow) to establish the reference lap (including, for example, reference brake points and/or a reference racing line). As stated above, a driver or user of the vehicle 100 can activate a user input 218 to indicate that the present lap is a reference lap and can further use the user input 218 to mark particular locations on the race track as reference brake points, reference turn-in points, reference track-out points, and/or other reference points. Further, the path driven during the slow lap can be recorded as the reference racing line. Allowing a slow lap to be recorded as the reference lap allows for exactness as to the location for each of the recorded reference points.

In various embodiments, the reference lap can be continuously updated, for example, upon completion of each subsequent lap. In one example, a previous reference lap may be replaced with a new reference lap if the total lap time is faster for the more recent completed lap. One goal in racing is to simply lower the overall lap time. Thus, in one embodiment, simply using the fastest lap time can take into account many of the performance aspects and variations that the race track as a whole presents, and allows for coaching to incrementally improve the entirety of a lap. However, in another embodiment, a portion of a previous reference lap may be replaced with a recorded portion of a subsequent lap if that portion was executed in less time. For example, if a turn or series of turns are separated from another series of turns, for example, by a straightaway, that turn or series of turns could be parsed and handled separately within the reference lap, therefore allowing improvements on portions of the race track to be recorded and updated.

Alternatively, a reference lap may be pre-recorded or pre-determined. For example, a vehicle 100 may include in memory device 204 data corresponding to suggested reference laps (including, for example, reference brake points and/or reference racing lines). This data may be stored on the memory device 204 (e.g., when the vehicle is purchased, or from previous visits to the race track), or may be updated later through communication interface 226. For example, a driver or user of the vehicle 100 may develop a reference lap (e.g., on a separate computer) or may download a reference lap from the Internet (possibly for free or as part of an additional pay service). The reference lap may be specific to the vehicle 100, any particular features and/or modifications to the vehicle 100, and/or the particular race track. The reference lap may be stored in memory device 204 or uploaded to memory device 204 via a separate device (e.g., a memory stick or a smartphone) that interfaces with controller 202 or memory device 204 through communication interface 226 (e.g., via a USB, Wi-Fi, Bluetooth connection). Alternatively, the data for the reference lap resides on the separate device (e.g., a smartphone or laptop) and is communicated to controller 202 through the communication interface 226 during use.

At step 1106, the controller 202 may record a reference brake point. The reference brake point may be recorded as part of recording a reference lap, or, alternatively, may be recorded independent of a reference lap. While racing, the brakes may be activated at various positions during the lap. In some embodiments it may be useful to record each brake activation and to coach a driver as to when to activate the brakes for each brake activation even if very light or having minimal impact. However, in other embodiments, and as discussed above, coaching may be best provided when limited to braking points having the greatest impact on the lap time. Thus, in accordance with various embodiments, filters can be established and/or utilized to determine whether or not to record a particular reference brake point and/or whether or not to provide coaching with respect to a particular reference brake point.

For example, at optional step 1108, a reference brake point may be recorded and/or coached when entry speed into a turn (a turn being the most common cause of a need to brake) exceeds an entry speed threshold. Step 1108 may further include the controller 202 determining whether the entry speed at the reference brake point is above the entry speed threshold. In a non-limiting example, if entry speed into the turn is less than a threshold of 50 MPH (or some other example threshold as may be selected per the needs of a particular vehicle 100, race track, driver, system, performance aspect, or other factor), then it may not be particularly useful to record and/or coach as to that particular reference brake point as early braking may have only a small impact on the overall lap time. However, if entry speed into a turn is, for example, 120 MPH, then activating the brakes at an ideal brake point may be more crucial to lap time and is more difficult to achieve (e.g., because the vehicle 100 is moving faster), and thus the reference brake point may be recorded and/or coached. The entry speed threshold may be pre-set, may be adjusted by the driver or user of the vehicle 100, and/or may be established for different portions of a physical race track (e.g., different turns having different entry speed thresholds).

At optional step 1110, a reference brake point may be recorded and/or coached when a brake application force exceeds a brake application force threshold (e.g., 50%, 60%, 70%, 80%, 90%, or some other brake application force threshold value as may be selected per the needs of a particular vehicle 100, race track, driver, system, performance aspect, or other factor). For example, as discussed above, a driver may feather the brakes by using low brake application force. However, at a critical braking point (e.g., upon entry into a turn after a straightaway), a driver may use high brake application force (e.g., slam on the brakes) to slow the vehicle 100 down as quickly as possible, for example, to allow maximum duration of high speed prior to the turn. In various embodiments, the brake application force threshold can be detected at the brake pedal 220 or another module coupled to the brake pedal 220. In various embodiments, a driver or other user of the vehicle 100 can select or change a selected brake application force threshold.

At optional step 1112, a reference brake point may be recorded and/or coached when a deceleration rate (e.g., $-m/s^2$ or $-g$) exceeds a deceleration rate threshold (e.g., exceeds a deceleration rate of 0.4 g, 0.5 g, 0.6 g, 0.7 g, or some other deceleration rate threshold value as may be selected per the needs of a particular vehicle 100, race track, driver, system, performance aspect, or other factor). Step 1112 may further include the controller 202 determining whether the deceleration rate at the reference brake point is above the deceleration rate threshold.

In one embodiment, the criteria described with respect to any or all of steps 1106, 1108, and 1110 may be required to be met prior to recording and/or coaching a reference particular brake point. For example, a reference brake point may be recorded when entry speed exceeds the entry speed threshold and brake application force exceeds the brake application force threshold. In another example, a reference brake point may be recorded when entry speed exceeds the entry speed threshold and the deceleration rate exceeds the deceleration rate threshold.

At optional step 1114, a reference brake point may be recorded and/or coached when a driver or user of vehicle 100 activates a user input 218 to manually mark the reference brake point. Alternatively, a reference brake point may be recorded and/or coached when a driver or user of vehicle 100 activates a user input 218 to manually indicate that an upcoming (or subsequent) braking event should be recorded and/or coached as a reference brake point.

At step 1116, the controller 202 may record the reference racing line, for example, as part of recording a reference lap. At step 1118, the controller 202 may store a reference lap, possibly including one or more reference brake points and/or a racing line, or individual reference brake points and/or racing lines into memory device 204 or another storage device internal or external to the vehicle 100.

In certain embodiments, various profiles may exist with respect to a particular vehicle 100 such that multiple drivers of a vehicle 100 can establish their own best lap times and reference laps (including, for example, reference brake points and reference racing lines). Further, in other embodiments, the data described as being provided to the driver may be provided to users or systems outside of the vehicle, for example, a pit crew, to provide instant feedback or to monitor performance.

The teachings disclosed herein are described with reference to coaching a driver of a vehicle on a physical race track. However, the teachings may be modified so as to provide coaching with respect to other non-racing driving aspects. For example, the teachings may be modified to provide coaching of new drivers, for example, during a driver's education program, during a truck driving training program, during a police driving program, or while otherwise training a new driver or an experienced driver in various settings. Further, these teachings may be useful in other application settings not specifically discussed herein.

So configured, a system 200 provides coaching for a driver of a particular vehicle 100 while the driver drives the vehicle 100 on a physical race track. The reference points used in coaching can be recorded and/or created with respect to that particular vehicle 100, therefore taking into account the performance aspects and performance limits of the vehicle 100. Thus, a driver can receive coaching particularly customized for the specific vehicle 100 and with accuracy to maximize the performance of the particular vehicle 100, thereby allowing the driver to improve lap times with the vehicle-specific coaching.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a random access memory (RAM), Flash-Programmable memory, and the like), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), or a hardware description language.

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment or various embodiments of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

What is claimed is:

1. A vehicle, comprising:
a windshield;
a global positioning satellite (GPS) system configured to determine a present location of the vehicle on a roadway, the GPS system including a GPS antenna;
a memory device configured to store a plurality of reference brake points corresponding to the roadway;
a display including at least one of an instrument cluster and a heads-up display, the instrument cluster is located adjacent to the windshield, and the heads-up display is configured to display information by way of the windshield; and
an electronic control unit (ECU) coupled to the GPS system, the memory device, and the display, the ECU is configured to:
receive a signal from the GPS system indicative of the present location of the vehicle on the roadway;
receive from the memory device at least one reference brake point of the plurality of reference brake points;
determine a remaining traveling distance between the present location of the vehicle on the roadway and the at least one reference brake point;
cause the at least one of the instrument cluster and the heads-up display to display in real-time to a driver of the vehicle a graphical representation of the remaining traveling distance between the present location of the vehicle and the at least one reference brake point;
record the at least one reference brake point as part of a reference lap;
store into the memory device the at least one reference brake point;
compare a brake application force to a brake application force threshold; and
record the at least one reference brake point when an entry speed is above an entry speed threshold and when the brake application force exceeds the brake application force threshold.

2. The vehicle of claim 1, wherein the memory device is further configured to store a reference racing line corresponding to the roadway, and wherein the ECU is further configured to:
receive from the memory device the reference racing line;
determine a present lateral distance between the present location of the vehicle and the reference racing line; and
cause the at least one of the instrument cluster and the heads-up display to display to the driver of the vehicle a graphic indication of the present lateral distance between the present location of the vehicle and the reference racing line.

3. The vehicle of claim 2, wherein the ECU is further configured to:
record the at least one reference brake point as part of the reference lap;
record the reference racing line as part of the reference lap; and
store into the memory device the at least one reference brake point and the reference racing line.

4. The vehicle of claim 1, further comprising:
a user input device configured to receive an input from the driver indicating the at least one reference brake point, wherein the ECU is further configured to record the at least one reference brake point upon receipt of the input from the driver indicating the at least one reference brake point by the user input device.

5. The vehicle of claim 2, wherein the ECU is further configured to:
record the reference racing line as part of the reference lap; and
store into the memory device the reference racing line.

6. The vehicle of claim 5, further comprising:
a user input device configured to receive an input from the driver indicating a present lap is the reference lap, wherein the ECU is further configured to record the reference lap upon receipt of the input from the driver indicating the reference lap by the user input device.

7. The vehicle of claim 2, wherein the reference racing line is stored in the memory device and is at least one of a predetermined racing line and a previously recorded racing line.

8. The vehicle of claim 2, wherein the ECU is further configured to: receive at least one previously recorded reference racing line by another vehicle;
determine a fastest lap by comparing the at least one previously recorded reference racing line by another vehicle to the reference racing line; and
record the fastest lap as the reference racing line.

9. The vehicle of claim 1, wherein the ECU is further configured to:
compare a deceleration rate to a deceleration rate threshold; and
record the at least one reference brake point when the deceleration rate exceeds the deceleration rate threshold.

10. A vehicle for transporting a driver along a roadway, comprising:
a windshield;
a location detection device configured to determine a present location of the vehicle on the roadway;
a memory device configured to store a plurality of reference brake points corresponding to the roadway;
a human-machine interface including an instrument cluster, and the instrument cluster is located adjacent to the windshield; and a controller coupled to the location detection device, the memory device, and the instrument cluster, the controller is configured to:
  receive a signal from the location detection device indicative of the present location of the vehicle on the roadway;
  receive from the memory device at least one reference brake point of the plurality of reference brake points;
  determine a remaining traveling distance between the present location of the vehicle on the roadway and the at least one reference brake point;
  cause the instrument cluster to display in real-time to the driver of the vehicle a graphical representation of the remaining traveling distance between the present location of the vehicle and the at least one reference brake point;
  compare a brake application force to a brake application force threshold; and
  record the at least one reference brake point when an entry speed is above an entry speed threshold and when the brake application force exceeds the brake application force threshold.

11. The vehicle of claim 10, wherein the location detection device includes a global positioning satellite system and an antenna.

12. The vehicle of claim 10, wherein the location detection device includes an inertial measurement system.

13. The vehicle of claim 10, wherein the human-machine interface further includes an audio output configured to emit an audible sound.

14. The vehicle of claim 10, wherein the human-machine interface further includes a tactile output configured to emit one of a vibration and a buzz.

15. The vehicle of claim 14, further comprising at least one of a steering wheel and a pedal, and wherein the tactile output is configured to emit the one of the vibration and the buzz in the at least one of the steering wheel and the pedal.

16. A vehicle for transporting a driver along a roadway, comprising:
  a windshield;
  a location detection device configured to determine a present location of the vehicle on the roadway;
  a memory device configured to store a plurality of reference brake points corresponding to the roadway;
  a human-machine interface including a heads-up display, and the heads-up display is configured to display information by way of the windshield; and
  a controller coupled to the location detection device, the memory device, and the heads-up display, the controller is configured to:
    receive a signal from the location detection device indicative of the present location of the vehicle on the roadway;
    receive from the memory device at least one reference brake point of the plurality of reference brake points;
    determine a remaining traveling distance between the present location of the vehicle on the roadway and the at least one reference brake point;
    cause the heads-up display to display in real-time to the driver of the vehicle a graphical representation of the remaining traveling distance between the present location of the vehicle and the at least one reference brake point;
    compare a brake application force to a brake application force threshold; and
    record the at least one reference brake point when an entry speed is above an entry speed threshold and when the brake application force exceeds the brake application force threshold.

17. The vehicle of claim 16, wherein the memory device is further configured to store a reference racing line corresponding to the roadway, and wherein the controller is further configured to:
  receive from the memory device the reference racing line;
  determine a present lateral distance between the present location of the vehicle and the reference racing line; and
  cause the heads-up display to display to the driver of the vehicle a graphic indication of the present lateral distance between the present location of the vehicle and the reference racing line.

18. The vehicle of claim 16, wherein the at least one reference brake point is one of a predetermined reference brake point and a recorded reference brake point.

* * * * *